March 1, 1938.  H. R. TEAR  2,109,832

LUBRICATING DEVICE

Filed April 15, 1936

INVENTOR
HARRY R. TEAR.
BY
ATTORNEY

Patented Mar. 1, 1938

2,109,832

UNITED STATES PATENT OFFICE 2,109,832

LUBRICATING DEVICE

Harry R. Tear, Evanston, Ill., assignor to The Lubrication Corporation, Chicago, Ill., a corporation of Delaware Application April 15, 1936, Serial No. 74,477

13 Claims. (Cl. 221—47.1)

This invention relates to lubricating devices and more particularly to power operated lubricant dispensers and to safety devices therefor.

In power operated lubricant dispensers having flexible discharge conduits or the like, difficulty has been encountered due to the building up of dangerously high pressures in the conduit when the discharge nozzle is closed or when a so-called "frozen" bearing is encountered. Such pressures have resulted in bursting of the conduits or have otherwise damaged the same.

Various methods of limiting the pressures have been proposed, including the use of devices to shut off the pump operating motor when a predetermined pressure is reached or of by-passing lubricant from the conduit back to the supply source after a predetermined pressure has been reached in the conduit. However, the first of these methods requires a relatively complicated and expensive control device to stop the flow of electric current or fluid under pressure or other power medium and the second method results in a waste of power consumed in uselessly pumping lubricant from the source through the by-pass and back to the source.

It is, accordingly, one of the objects of the present invention to provide a lubricant dispenser in which pressure in the discharge conduit is limited without waste of power.

Another object of the invention is to provide a lubricant dispenser in which the pump outlet is closed when a predetermined pressure is reached in the discharge conduit.

Another object is to provide a lubricant dispenser in which the pump outlet is closed in response to one pressure in the conduit and the conduit is connected to the supply source in response to a higher pressure.

Still another object is to provide a novel safety device for a lubricant dispenser.

Other objects, advantages and novel features of the invention will be apparent from the following description when read in connection with the accompanying drawing, in which:

Fig. 1 is a side elevation of a power operated lubricant dispenser embodying the invention;

Figure 1:
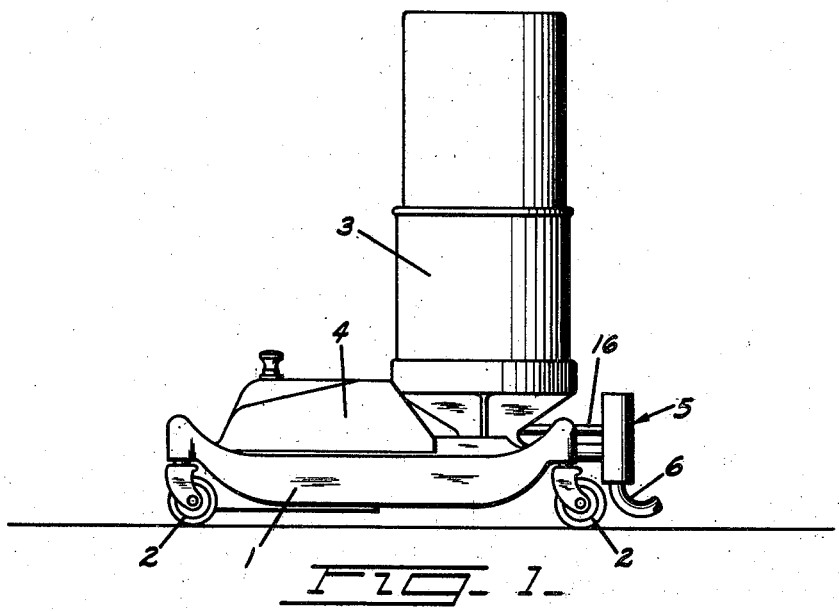

The dispenser illustrated on the drawing comprises a base 1 mounted on wheels 2 by which it may be readily moved from place to place during use. The base 1 supports a barrel 3 which may be filled with bulk lubricant but which prefer-ably serves as a housing for an interchangeable factory filled lubricant cartridge. A motor 4, illustrated as of the compressed air operated type, is mounted on the base 1 and operates a lubricant pump whose discharge is connected to a safety device indicated generally at 5. The safety device communicates with a discharge conduit 6 which is preferably flexible so that it may be handled readily during use.

Figure 2:
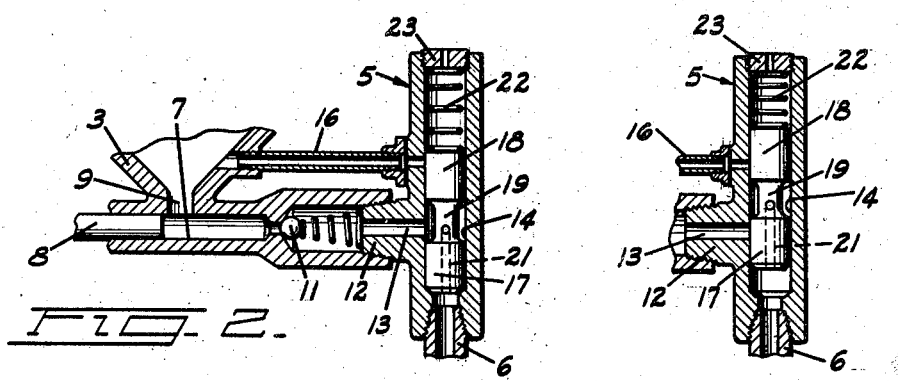
Fig. 2 is a section of the dispenser of Fig. 1 showing the safety device.

As shown particularly in Fig. 2, the barrel 3 communicates with a pump cylinder 7 in which a piston 8 driven by the motor 4 reciprocates. The cylinder 7 has an inlet opening 9 communicating with the barrel 3 and has an outlet controlled by a spring pressed check valve 11. The safety device 5 has a threaded boss 12 on one side thereof which may be screw threaded or otherwise suitably fastened in the pump outlet and which is formed with an inlet opening 13 communicating with the side of cylinder 14 formed in the safety device. A second side opening 15 is formed in the cylinder 14 at a point axially spaced from the opening 13 and a conduit 16 connected to opening 15 by a bolted flange, connects with the barrel 3. The lower end of the cylinder 14 is connected to the conduit 6 by means of screw threads or the like as shown.

The cylinder 14 slidably receives a valve of the spool type including enlarged ends 17 and 18 and a reduced central portion 19. The valve is provided with a bore indicated at 21 connecting the reduced portion 19 to the end 17 adjacent the conduit 6 and a compression spring 22 held in place by a screw threaded plug 23 seats against the end 18 of the valve to urge it downwardly into the position shown in Fig. 2.

In operation when the pressure in the conduit 6 is less than that for which the spring 22 is adjusted, the valve will occupy the position shown in Fig. 2 in which the opening 13 is in register with the reduced portion 19 of the valve and communication is established between the pump outlet and the conduit 6 around the valve reduced portion and through the bore 21. If a pressure higher than that for which the spring 22 is adjusted should be developed in the conduit 6 due to closing the discharge nozzle thereon or to encountering extremely high resistance in a bearing or the like, such pressure will react on the lower end 17 of the valve and urge it upwardly against the spring 22 into the position shown in Fig. 3. In this position the end 17 of the valve closes off the opening 13 and interrupts communication between the pump outlet and the conduit. This will cause stalling of the motor 4 and will prevent unnecessary waste of power, the motor remaining stationary so that no fluid can flow therethrough to be wasted.

Figure 3:
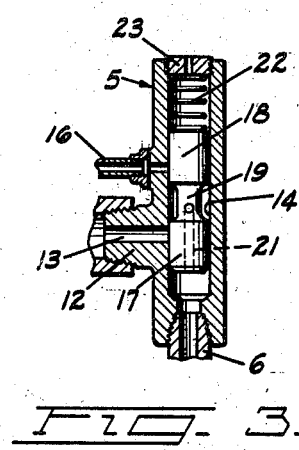
Figs. 3 and 4 are sections similar to Fig. 2 showing different positions of the parts.
Figure 4:
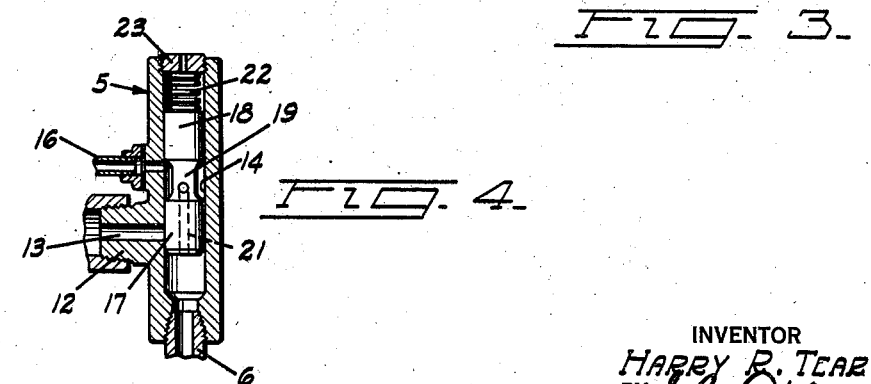

Preferably the valve has a relatively tight fit in the bore 14 so that when the parts are in the position shown in Fig. 3, the pump outlet will be completely closed off. However, in case there should be leakage around the valve, a higher pressure might be built up in the conduit 6 and result in bursting or otherwise damaging the conduit. In order to eliminate this danger, the valve is arranged to move farther, in response to such higher pressure, against the spring 22 into the position illustrated in Fig. 4. It will be noted that in this position the pump outlet is still closed by the enlarged part 17 of the valve, but that the conduit 16 is in register with the reduced portion 19.

With the parts in this position, lubricant under pressure in the conduit 6 will flow through the bore 21 around the reduced valve portion 19 and through the conduit 16 into the barrel 3, thereby to relieve the pressure in the conduit and to prevent its reaching a dangerous value. It will be apparent that the parts will occupy the position shown in Fig. 4 only temporarily since the valve will immediately again move down into the position of Fig. 3 as soon as the pressure in the conduit is reduced below that necessary to cause registration of reduced portion 19 with conduit 16.

While only one embodiment of the invention has been shown and described, it will be apparent that the same might be embodied in other forms or that various changes might be made in the form shown. It is, accordingly, not intended that the scope of the invention shall be limited to the form shown or otherwise than by the terms of the appended claims.

I claim:

1. A lubricating device comprising, a source of lubricant supply, a pump connected to receive lubricant from said source and to discharge it under pressure, and means operable in response to back pressure on the pump discharge to close the pump discharge when a predetermined pressure is reached.

2. A lubricating device comprising, a source of lubricant supply, a pump connected to receive lubricant from said source and to discharge it under pressure, a discharge conduit connected to the pump, and means responsive to back pressure in said conduit to close off said conduit from said pump in response to a predetermined pressure and to connect the outlet end of said conduit to said source in response to a higher pressure.

3. A lubricating device comprising, a source of lubricant supply, a pump connected to receive lubricant from said source and to discharge it under pressure, a fluid motor for operating said pump, a discharge conduit connected to the pump, and means operable in response to back pressure on the pump discharge to close the pump discharge when a predetermined pressure is reached.

4. A lubricating device comprising, a source of lubricant supply, a pump connected to receive lubricant from said source and to discharge it under pressure, a fluid motor for operating said pump, a discharge conduit connected to the pump, means for closing said discharge conduit in response to a predetermined pressure therein, and for connecting the outlet end of said conduit to said source in response to a higher pressure.

5. A lubricating device comprising, a source of lubricant supply, a pump connected to receive lubricant from said source and to discharge it under pressure, a fluid motor for operating said pump, a discharge conduit connected to the pump, a valve member in said conduit movable in response to a predetermined pressure on the outlet end thereof to close the conduit, and a connection from said valve to said source, the valve being operable in response to a higher pressure to establish communication between the outlet end of the conduit and the source.

6. A lubricating device comprising, a source of lubricant supply, a pump connected to receive lubricant from said source and to discharge it under pressure, a fluid motor for operating said pump, a discharge conduit connected to the pump, a spool valve slidably mounted in said conduit with its reduced central portion normally communicating with the pump outlet, said valve having a bore therethrough from said central portion to one of its ends to establish communication from the pump outlet to the outlet end of the conduit, resilient means normally urging the valve to a position with its reduced central portion communicating with the pump outlet, said means adapted to yield in response to a predetermined pressure in the conduit whereby the valve will move to a position to close the pump outlet.

7. A lubricating device comprising, a source of lubricant supply, a pump connected to receive lubricant from said source and to discharge it under pressure, a fluid motor for operating said pump, a discharge conduit connected to the pump, a spool valve slidably mounted in said conduit with its reduced central portion normally communicating with the pump outlet, said valve having a bore therethrough from said central portion to one of its ends to establish communication from the pump outlet to the outlet end of the conduit, resilient means normally urging the valve to a position with its reduced central portion communicating with the pump outlet, said means adapted to yield in response to a predetermined pressure in the conduit whereby the valve will move to a position to close the pump outlet, and a connection from the conduit to said source, said connection being closed by the valve in both of said positions and communicating with the central portion of the valve in a third position to which the valve is moved by a higher pressure in the conduit.

8. In a lubricating device having a source of lubricant, a pump and a discharge conduit, a safety device comprising, a valve movable automatically in response to a predetermined pressure to close the pump outlet, thereby to prevent building up of excessive pressure in the conduit.

9. In a lubricating device having a source of lubricant, a pump and a discharge conduit, a safety device comprising, a valve movable automatically in response to a predetermined pressure to close the pump outlet, and movable farther in response to a higher pressure to establish communication between the conduit and the source.

10. In a lubricating device having a source of lubricant, a pump and a discharge conduit, a safety device comprising, a cylinder communicating with the conduit, a plunger member slidably mounted in said cylinder, resilient means for urging said member in one direction, the member being movable in the opposite direction in response to lubricant pressure to close the conduit.

11. In a lubricating device having a source of lubricant, a pump and a discharge conduit, a safety device comprising, a cylinder having a side opening communicating with the pump outlet, a spool valve slidable in said cylinder, resilient means normally urging the valve to a position with its reduced central portion communicating with said opening, said valve being movable in response to fluid pressure in the conduit to close said opening.

12. In a lubricating device having a source of lubricant, a pump and a discharge conduit, a safety device comprising, a cylinder having a first side opening communicating with the pump outlet and a second spaced side opening communicating with the source, a spool valve slidable in the cylinder, resilient means normally urging the valve to a position with its reduced center portion communicating with the first opening and one of its end portions closing the second opening, said valve being movable in response to lubricant pressure in the conduit to a position with its center portion communicating with the second opening and one of its ends closing the first opening.

13. In a lubricating device having a source of lubricant supply, a pump and a discharge conduit, a safety device comprising, a cylinder having a first side opening communicating with the pump outlet, a second side opening communicating with the source of supply and one of its ends connected to said conduit, a spool valve slidably mounted in the cylinder having a bore connecting its reduced center portion to the end adjacent said conduit, resilient means urging the valve to a position with its center portion in register with the first opening and one of its ends closing the second opening, said valve being movable in response to a predetermined pressure in the conduit to a position in which it closes both of said openings and movable farther in response to a higher pressure in the conduit to a position in which its reduced center portion is in register with said second opening and one of its ends closes the first opening.

HARRY R. TEAR.